(12) United States Patent
Halaas

(10) Patent No.: US 8,019,492 B2
(45) Date of Patent: Sep. 13, 2011

(54) OPERATOR FINE TRACKING ASSIST USING SENSOR DERIVED INPUTS

(75) Inventor: David J. Halaas, Buckley, WA (US)

(73) Assignee: The Boeing Company, Chicago, IL (US)

( * ) Notice: Subject to any disclaimer, the term of this patent is extended or adjusted under 35 U.S.C. 154(b) by 991 days.

(21) Appl. No.: 11/924,879

(22) Filed: Oct. 26, 2007

(65) Prior Publication Data

US 2009/0112456 A1    Apr. 30, 2009

(51) Int. Cl.
*G05D 1/12*    (2006.01)
(52) U.S. Cl. .............. 701/12; 244/76 R; 244/135 A; 700/37; 701/3
(58) Field of Classification Search .............. 244/175, 244/76 R, 135 A; 318/561; 700/29, 37; 701/3, 11, 24, 200, 12
See application file for complete search history.

(56) References Cited

U.S. PATENT DOCUMENTS

| | | | |
|---|---|---|---|
| 3,446,946 A * | 5/1969 | Andeen | 700/29 |
| 3,648,031 A * | 3/1972 | Neal | 702/194 |
| 4,030,011 A * | 6/1977 | Hendrick et al. | 318/561 |
| 4,419,732 A * | 12/1983 | Lambregts et al. | 701/16 |
| 2008/0302916 A1 | 12/2008 | Speer | |

* cited by examiner

*Primary Examiner* — Khoi Tran
*Assistant Examiner* — Stephen Holwerda
(74) *Attorney, Agent, or Firm* — Ostrager Chong Flaherty & Broitman P.C.

(57) ABSTRACT

A preferred embodiment of a method for fine-tracking operator assistance for controlling movement of an object toward a target combines an operator input for guiding the object toward the target with a sensor-derived input from sensor measurement of the object's position relative to the target's position. The combined input is separated into low and high frequency content, and a Low Frequency Authority Limit component applies a pre-determined gain over a selected range to the low frequency content, while a High Frequency Authority Limit component applies a pre-determined gain over a selected range to the high frequency content. The low-frequency gain output is combined with the high-frequency gain output as a total control input for control of the object relative to the target.

16 Claims, 3 Drawing Sheets

OPERATOR FINE TRACKING ASSIST USING SENSOR DERIVED INPUTS

BACKGROUND

Embodiments of the present invention are related to man-machine systems capable of completing complex mechanical control tasks, and more particularly to blending human operator inputs with inputs derived from sensor measurements for the specified task to improve task performance and reduce operator workload.

By using accurate and appropriate sensors, autonomous control systems can be constructed that can out-perform a human operator for a specific, narrowly defined task. Complex mechanical control missions, consisting of broadly defined tasks executed in any specified order, require a complex autonomous system capable of operating in multiple modes with associated mode switching criteria. Such systems may be susceptible to failure when presented with unforeseen circumstances. A well trained human operator, on the other hand, can adapt to unexpected circumstances and apply judgment in order to complete a complex mission.

Traditionally, the problem of integrating a control system using sensor-derived control inputs with the presence of an expert operator has taken three basic approaches:

1. The operator can act as a supervisor of a full-authority autonomous control system configured to operate in a number of modes, each capable of completing a specific task. The operator is responsible for engaging and disengaging the autonomous system via toggle switches, as well as selecting a mode via momentary switches as appropriate for the specified task. Operator override requires explicit disengagement of the autonomous system.

2. An autonomous control system having a number of modes can provide an operator with "suggested" options via a control panel. In this case, the autonomous system has zero authority and the operator is solely responsible for operating the control inputs.

3. A system having an "outer-loop" control law, using sensor inputs appropriate for a specified task, can generate an automatic input that is added directly to the human operator's input. An authority limit is used to ensure that the operator can override the automatic input.

The disadvantages of the prior approaches to man-machine systems include the following. A full-authority autonomous control system requires that the human operator have expert knowledge of all the modes of operation of the system in order to perform the necessary switching, engage/disengage, and override functions. The operator will be somewhat disconnected from the task, since the autonomous system has full authority, and will be instead relegated to monitoring the system closely to ensure the proper mode is engaged and performed. Any loss of situational awareness regarding engagement or mode state can have catastrophic consequences depending on the criticality of the task. On the other hand, when suggested options are provided by a zero-authority autonomous system, the operator must make an intervening judgment and apply the correct decision. Human operators are subject to considerable neuromuscular reaction delay in response to a flash input, typically in the range of 200 ms, which can severely limit the operator's achievable task performance. In the case of "outer-loop" control law systems, the autonomous control inputs are applied in parallel with the operator's inputs, and although the operator may have the ability to override, problems can arise due to a duplication of control effort when both the operator and the control law are tracking the same objective. Such a duplication of control effort could result in overcompensation by the combined man-machine system. In this case, the operator's must compensate for the effects of the control law as well as the characteristics (dynamics) of the system.

SUMMARY

In a preferred embodiment of the invention, a system for fine-tracking operator assistance in performing a control task for controlling movement of an object toward a target comprises: an input component for combining an operator input for guiding the object toward the target with a sensor-derived input based on a sensor measurement of the object's position relative to the target's position; a low/high filtering component for separating the input combined by the input component into a low frequency content and a high frequency content; a Low Frequency Authority Limit component for applying a first gain over a selected range to the low frequency content filtered by the low/high filtering component to provide a low-frequency gain output; a High Frequency Authority Limit component for applying a second gain over a selected range to the high frequency content filtered by the low/high filtering component to provide a high-frequency gain output; and an output component for combining the low-frequency gain output from the Low Frequency Authority Limit component with the high-frequency gain output from the High Frequency Authority Limit component to form a total control input for control of movement of the object relative to the target.

In a particularly preferred implementation, the input component has a subtractor for subtracting the operator input from the sensor-derived input to obtain a combined difference input. The filtering component has a low-pass filter for filtering the low frequency content, and obtaining the high frequency content by subtracting it from the combined difference input. In tasks where fine-tracking assistance is needed only in a narrow range of high frequency content, the Low Frequency Authority Limit range is set to zero in order to minimize autonomous interference with operator input, and the High Frequency Authority Limit range is set to infinity to maximize high frequency tracking assistance for sensor-derived input. The output component includes an Engage/Disengage (E/D) component which provides the combined output when the object relative to the target is in a selected region of assistance. Embodiments of the invention may also encompass the related method of fine tracking assistance.

In one embodiment of the invention, adjusting the ranges of low and high frequency authority limits can be used to minimize interference by the sensor-derived inputs during intentional operator override. It blends sensor-derived inputs with operator inputs to complete a tracking task in a manner that avoids duplicating control effort or interfering with the operator in ranges when the operator should override. It thus provides machine assistance only when needed, and with varied authority limit to provide increased assistance from sensor-derived input in the frequency ranges where operator input may be less capable. This can simultaneously reduce operator workload and improve performance of the man-machine system, as compared to existing systems which do not blend or facilitate cooperation between the sensor-derived inputs and operator input.

Other objects, features, and advantages of the various embodiments of the present invention will be explained in the following detailed description with reference to the appended drawings.

DETAILED DESCRIPTION

Figure 1:
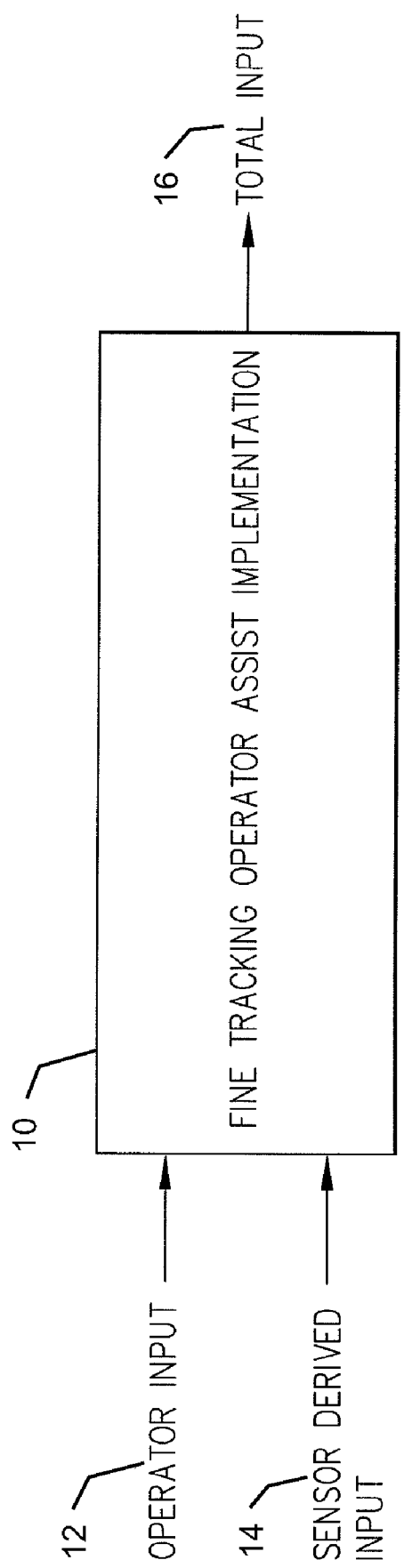
FIG. 1 illustrates a system implementing a basic control process for fine-tracking operator assistance in a man-machine system in accordance with an embodiment of the present invention.

In the following detailed description, certain preferred embodiments are described as illustrations of the invention in a specific application, network, or computer environment in order to provide a thorough understanding of the present invention. Those methods, procedures, components, or functions which are commonly known to persons of ordinary skill in the field of the invention are not described in detail as not to unnecessarily obscure a concise description of the present invention. Certain specific embodiments or examples are given for purposes of illustration only, and it will be recognized by one skilled in the art that the present invention may be practiced in other analogous applications or environments and/or with other analogous or equivalent variations of the illustrative embodiments.

Some portions of the detailed description which follows are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system, which may be one of any type having suitable computing resources and configured to fetch, decode, and execute computer instructions. Aspects of the present invention are also discussed with respect to an Internet system including electronic devices and servers coupled together within the Internet platform, but it may be similarly implemented on any other type of extended network system including wireless data or digital phone networks. Although a variety of different computer systems can be used with the present invention, an exemplary computer system is shown and described in the preferred embodiments. As used herein, the term exemplary indicates an example and not necessarily an ideal.

A preferred embodiment for implementation of the invention is described below adapted for the control task environment of refueling an aircraft in flight. A prior type of man-machine control system for guiding a refueling boom to a target refueling manifold (i.e. receptacle) was described in commonly-owned U.S. patent application Ser. No. 11/090,347, filed on Mar. 24, 2005, entitled "System and Methods for Automatically and Semi-automatically Controlling Aircraft Refueling", and may be referred to as an example of the type of task environment addressed in the exemplary embodiments of the present description.

Referring to FIG. 1, a system 10 implementing a basic control process for fine-tracking operator assistance in a man-machine system is illustrated. While performing a complex control task, the operator's input is combined with sensor-derived input to obtain a total control input that seamlessly integrates the operator with machine functionality, and simplifies operation by eliminating any requirement for the operator to make intervening judgments or to engage/disengage system modes through monitoring of the system's operation. The operator and sensor-derived inputs are combined via a Fine Tracking Operator Assist Implementation that ensures cooperation (prevents duplication of control effort) between the operator and the autonomous functions of the system.

Figure 2:
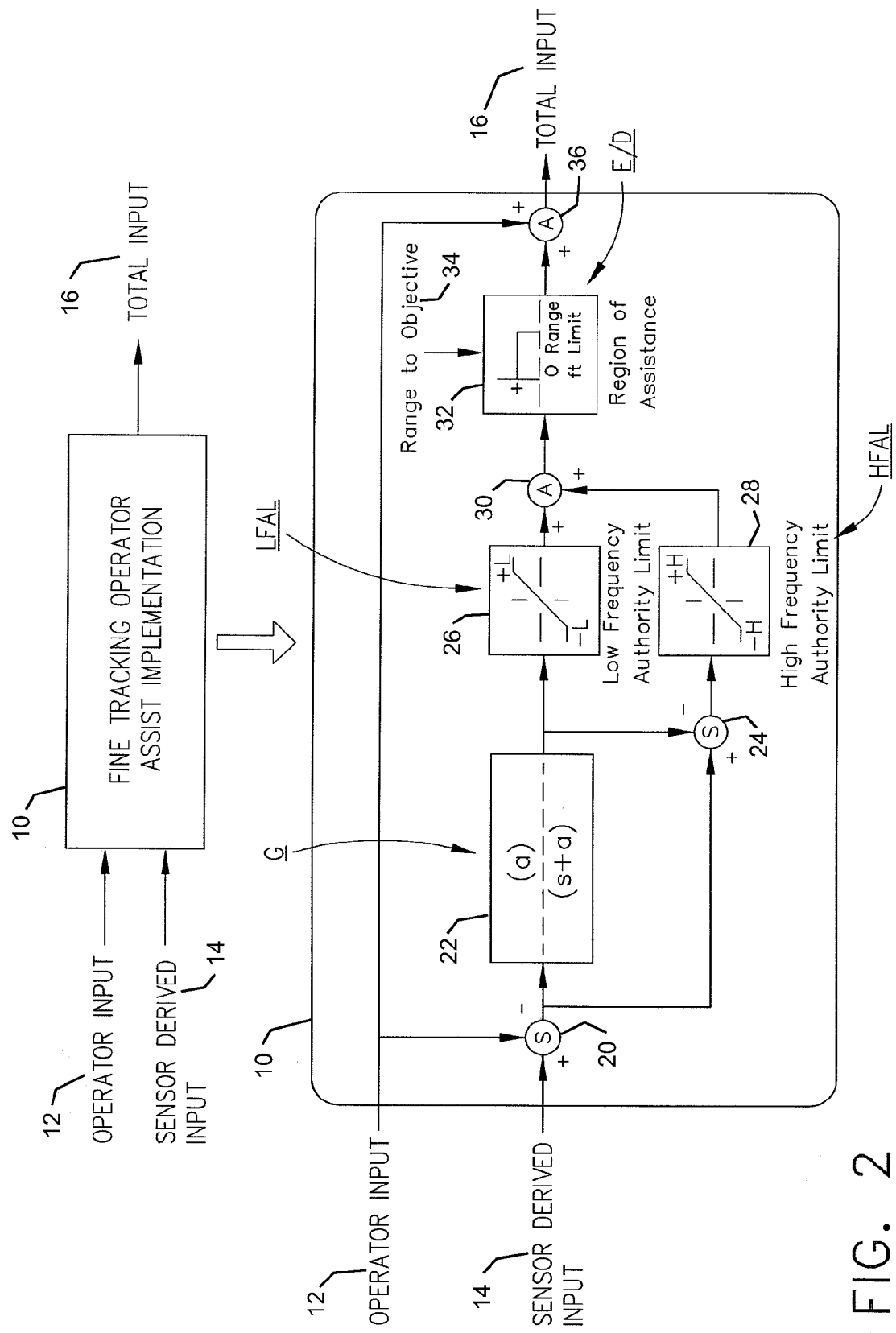
FIG. 2 illustrates a preferred embodiment for a Fine Tracking Operator Assist Implementation of the present invention.

In FIG. 2, a preferred embodiment for the Fine Tracking Operator Assist Implementation is illustrated for control of any mechanical device for moving an object relative to a target. Operator input 12 and sensor-derived input 14 are fed into an input portion of the system 10. The operator input is subtracted from the sensor-derived input through a subtractor component S 20 in order to derive the combined difference input. The combined difference input from subtractor S is passed through a filter G 22 which separates the input based on low and high frequency content. For example, low frequency content may be a gross positional measurement of an object from its target, and high frequency content may be vibrational or short-cycle movement of the object as it is moved toward the target. For human operated systems, the filter G is typically, although not limited to, a low pass filter (a/s+a) to filter out the low frequency content. System 10 also includes a subtractor component 24 for subtracting the filtered low frequency content from the input combined by the input component to obtain the high frequency content. The low frequency content filtered by the filter G is passed to a Low Frequency Authority Limit (LFAL) component 26. It is also branched and subtracted from the combined difference input in order to pass high frequency content to a High Frequency Authority Limit (HFAL) component 28. The LFAL component applies a pre-determined gain (or gain shape) over a selected range to the low frequency content filtered by the filter G. The HFAL component applies another pre-determined gain (or gain shape) over a selected range to the high frequency content passed by the filter G. This spectral separation of control input content allows for the application of dissimilar authority limits over different frequency ranges of control input. The outputs of the LFAL and HFAL components are provided as the total control input to be used to control the mechanical device used to move the object relative to the target. The object may be a refueling boom and the target may be a refueling receptacle for an in-flight refueling system. Alternatively, the object and the target may be used in a simulation environment for crew training.

The LFAL and HFAL authority limits are used to vary the level of assistance, or autonomy, over different frequency ranges. Values of the authority limits are scaled to match the full scale operator inputs. Allowing a given authority limit to equal the operator's full scale input results in full autonomy over the corresponding frequency range. An authority limit of zero results in no assistance over the corresponding frequency range. For human operated systems these authority limits can be matched to the operator's strengths and weaknesses. For example, human operators are easily capable of low frequency, or slow, control tasks but struggle with tracking tasks above one to two hertz. For this case, a low frequency authority limit of zero will minimize autonomous interference with the operator while a large high frequency authority limit will allow for high frequency tracking assistance.

The outputs of the varied authority limits are added together through an adder component A 30 and fed to an Engage/Disengage (E/D) component 32 which engages the varied authority limit assistance function in a selected Region of Assistance. In this manner, an output component 30 may be used for combining the low-frequency gain output from the Low Frequency Authority Limit component with the high-frequency gain output from the High Frequency Authority Limit component to form a total control input for control of movement of the object relative to the target. A range-to-objective (sensor) input 34 of is fed to the E/D component, which engages the assistance function when the range is within the Region of Assistance and disengages it when outside the range. The Region of Assistance function is defined for a given tracking target which provides additional scaling of the authority limited assistance. The Region of Assistance serves to prevent tracking assistance when the operator is far from a given target. This function can be as simple as an "assistance on/off" threshold or could be a smooth function that scales the input from zero to one based on range to target. The region-of-assistance function shape will depend on the mission or tasks of the human operated system. An adder component 36 adds the combined output to the operator input in order to derive the total control input 16 for control of a controlled mechanical device for moving the object relative to the target. The authority limit ranges of the Low Frequency Authority Limit component and the High Frequency Authority Limit component may be adjustable to allow for variable autonomy configurations ranging from fully autonomous with sensor-derived input to fully operator controlled.

The E/D assistance function is added to the operator input through adder component A to derive the total (control) input 16. When the assistance function is disengaged, the E/D output is zero and the operator input provides the total control input. When the assistance function is engaged, the operator/sensor difference input with varied authority limit assistance for different frequency ranges of content is added to the operator input and provided as the total control input. The engagement or disengagement of the assistance function is selected depending on the specific characteristics for optimal performance in the task environment. For example, when approaching a target from a far distance, it may be preferable to allow the human operator to navigate without machine assistance. However, when finer control is needed close-in to the target, it may be preferable to blend human control input with machine assistance. Further, there may be some tasks when machine control is preferable without any human input.

In this manner, the low and high frequency authority limits can be used to minimize interference by the sensor-derived inputs during intentional operator override. The Fine Tracking Assist Implementation blends sensor-derived inputs with operator inputs to complete a tracking task in a manner that avoids duplicating control effort or interfering with the operator in ranges when the operator should override. The Fine Tracking Assist Implementation provides machine assistance only when needed, and with varied authority limit to provide increased assistance from sensor-derived input in the frequency ranges where operator input may be less capable. This can simultaneously reduce operator workload, reduce operator overcompensation, and improve performance of the man-machine system, as compared to existing systems which do not blend or facilitate cooperation between the sensor-derived inputs and operator input.

The ability to apply dissimilar authority limits over different frequency ranges allows this method to deliver task performance improvement and operator workload reduction even in the presence of some sensor errors. For example, a low frequency authority limit of zero can make this method robust to any amount of constant sensor bias while still providing assistance to the operator with high frequency aspects of a fine tracking task. The adjustable authority limits allow for variable autonomy configuration ranging from fully autonomous to fully manned.

The Fine Tracking Assist Implementation described above is designed to function in a manner transparent to the operator. Unlike the fully autonomous system, the present system is implicitly engaged, via authority limits, when the operator reduces the task error below some threshold. Authority limits are also used to implicitly deactivate this system when the operator applies sufficient inputs away from the tracking task objective. Unlike the zero-autonomy system, the sensor-derived inputs are applied directly to the operator input, resulting in an increase in task performance (assuming sufficiently accurate sensors). Unlike the method of applying parallel inputs, the present system blends the sensor-derived inputs with the operator input, using a complementary filter, in order to prevent a duplication of control effort. As a result, the operator does not need to compensate for the sensor-derived inputs, and can apply the same control strategy with or without the sensor-derived inputs. Addition of the sensor-derived inputs will typically result in a reduction in the required amount of operator compensation.

When engaged near the tracking task objective, the Fine Tracking Assist Implementation "corrects" some portion of the operator's inputs. This correction allows the operator to apply a more reactionary control strategy, that is, the operator can simply react to the observed task error with little or no anticipation. The reduction in the level operator anticipation translates into a reduced workload and/or space capacity for performance improvements. Fully authority autonomous systems do not necessarily reduce the operator workload to zero since the operator must maintain situational awareness regarding the autonomous system. The present system can reduce the workload to a level similar to that of "autonomous system supervision" without the added complexity for operator monitoring of a fully authority autonomous system.

Figure 3:
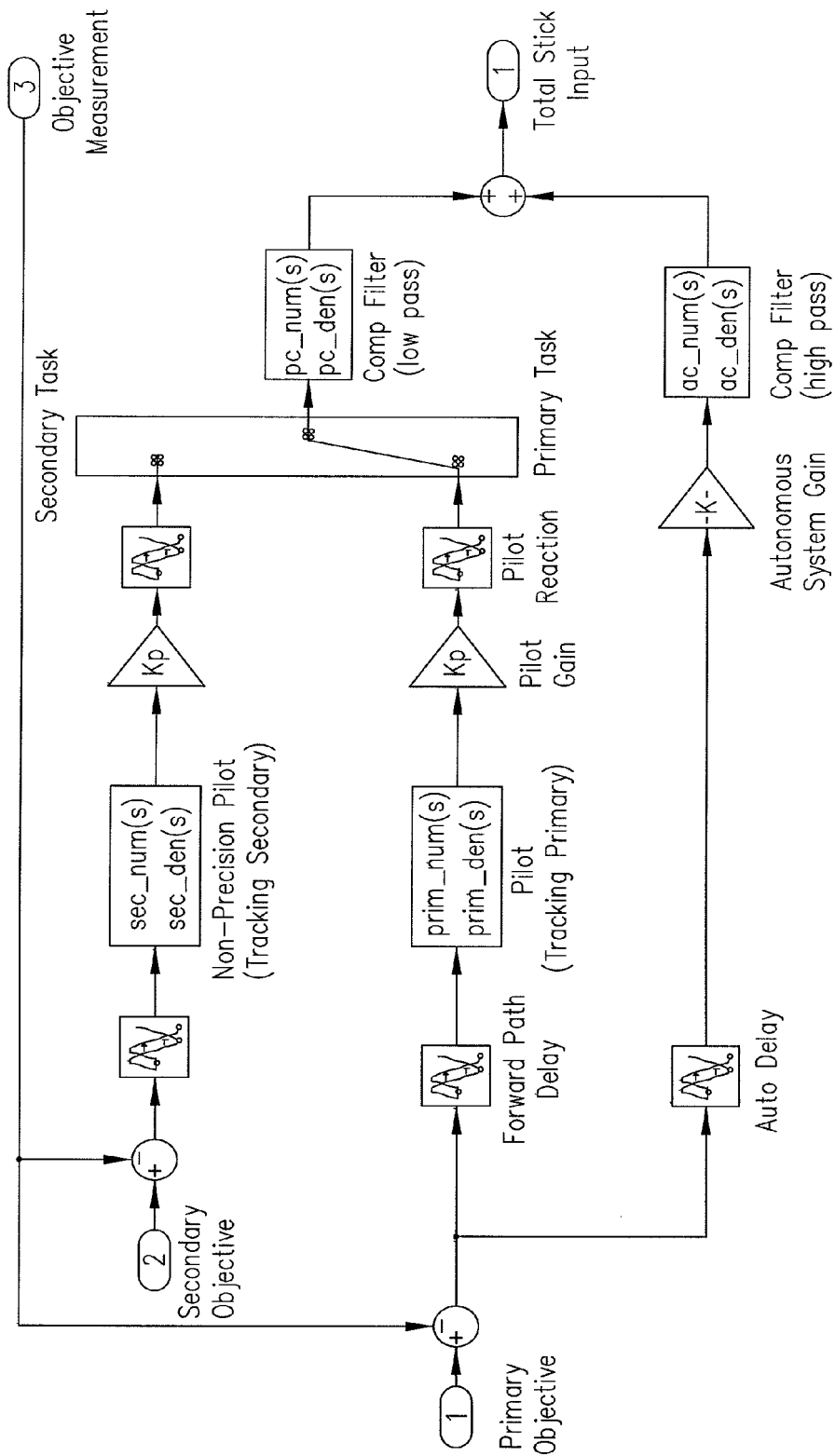
FIG. 3 illustrates a linear implementation model for analysis of the Fine Tracking Assist Implementation for the aircraft refueling task environment.

As illustrated in FIG. 3, a linear implementation model was developed for analysis of the Fine Tracking Assist Implementation for the aircraft refueling task environment. If the low frequency authority is set to zero, and if the high frequency authority limit is set to infinity, the tracking assist control law is reduced to a complementary filter. The complementary filter combines the low frequency operator input with high frequency autonomous tracking input. While this filtering provides improved tracking performance, excessive low pass filtering the operator's input can degrade the system performance for non-tracking tasks. An optimal value for the tracking assist control law filter can be found in order to balance tracking assistance with operator interference. In the linear implementation model, Pilot Reaction in performing a Primary Task toward a Primary Objective is filtered for low frequency input through Comp (Low Pass) Filter, while overall input is subject to Autonomous System Gain and filtered for high frequency input through Comp (High Pass) Filter. The Total Stick Input is compared against what an operator would deem an optimal feel for the total control input. Pilot Reaction in performing a Secondary Task toward a Secondary Objective can also be analyzed in this way. The model is intended to identify an optimal filter break frequency which provides assistance to a tracking operator (Task Switch Down) without degrading the handling qualities for a non-tracking operator (Task Switch Up). This analysis predicted a reduction in operator workload and an increase in man-machine tracking performance.

A real-time simulation test was conducted with an operator in the loop to verify the predicted improvements in operator performance and workload. The test was conducted using a generic Aerial Refueling Boom as the machine and five trained Aerial Refueling Operators and two trained Test Pilots as the human operators. The specified task was fine tracking of a receptacle. The test was conducted in an Aerial Refueling System Simulator. The low frequency authority limit of the Operator Fine Tracking Assist was set to zero so the autonomous system could not control steady boom position. The operator's task difficulty was varied by changing the forward path pure time delay applied to the operators stick input. The operators were not aware of the amount of pure time delay or when the Operator Fine Tracking Assist was active. The testing showed significant results that the operators did not notice the assistance inputs while executing the fine tracking task, thereby evidencing system transparency. The Operator Handling Quality Ratings recorded for test points with the Fine Tracking Assist system were consistently better, both for individual operators and the test population as a whole, than those recorded for baseline cases, thereby evidencing reduced operator workload. Data recorded during the evaluation showed performance improvements achieved by the Fine Tracking Assist system ranged from about 2% to about 30% when compared to the baseline cases.

The above-described principles of applying dissimilar authority limits over different frequency ranges of control input may similarly be applied in other man-machine task environments, such as piloting air vehicles or robotic-assisted control systems. Modified methodologies may be adapted to the particular task environment of target tracking error.

Many modifications and variations may of course be devised given the above description of the principles of the invention. It is intended that all such modifications and variations be considered as within the spirit and scope of this invention, as defined in the following claims.

What is claimed is:

1. A system for fine-tracking operator assistance in performing a control task for controlling movement of an object toward a target, said system receiving an operator input signal and a sensor derived input signal, and determining a total control input, said system comprising:
   a first subtractor component subtracting said operator input signal from said sensor derived input signal, to produce a combined difference input signal;
   a low/high filtering component for separating the combined difference input signal into a low frequency portion of the combined difference input signal and a high frequency portion of the combined difference input signal;
   a Low Frequency Authority Limit component applying a first gain shape to the low frequency portion of the combined difference input signal to provide a low-frequency gain output;
   a High Frequency Authority Limit component for applying a second gain shape to the high frequency portion of the combined difference input signal to provide a high-frequency gain output;
   an adder component adding the low-frequency gain output with the high-frequency gain output to form an adjusted sensor derived signal; and
   an output component adding the operator input signal with the adjusted sensor derived signal to form the total control input for control of movement of the object relative to the target.

2. The system of claim 1, wherein:
   said low/high filtering component includes a low-pass filter, and a second subtractor component;
   said low-pass filter filtering the sensor derived input signal to generate the low frequency portion of the sensor derived input signal;
   said second subtractor component subtracting the low frequency portion of the sensor derived input signal from the combined difference input signal to produce the high frequency portion of the combined difference input signal.

3. The system of claim 1, wherein said Low Frequency Authority Limit component has a low frequency authority limit set to zero in order to minimize autonomous interference with operator input which is represented by low frequency content.

4. The system of claim 1, wherein said High Frequency Authority Limit component has a high frequency authority limit set to infinity in order to maximize high frequency tracking assistance for sensor-derived input which is represented by high frequency content.

5. The system of claim 1, wherein said output component includes an Engage/Disengage (E/D) component which scales the adjusted sensor derived signal between zero and one based on a range to objective input and a region-of-assistance function shape.

6. The system of claim 5, wherein said the range-to-objective input is a range of the object relative to the target; and
   the Engage/Disengage (E/D) component scales the adjusted sensor derived signal to one when the range-to-objective input is within a region of assistance and scales the adjusted sensor derived signal to zero when the range-to-objective input is outside the region of assistance.

7. The system of claim 1, wherein:
   the Low Frequency Authority Limit component operates within a low frequency authority limit range;
   the High Frequency Authority Limit component operates within a high frequency authority limit range; and
   the low frequency authority limit, the high frequency authority limit, the low frequency authority limit range and the high frequency authority limit range are all adjustable to allow for variable autonomy configurations ranging from fully autonomous with sensor-derived input to fully operator controlled.

8. A method for fine-tracking operator assistance in performing a control task for controlling movement of an object toward a target comprising:

receiving an operator input signal and a sensor derived input signal;

subtracting said operator input signal from said sensor derived input signal to produce a combined difference input signal;

separating the combined difference input signal into a low frequency portion of the combined difference input signal and a high frequency portion of the combined difference input signal;

applying a first gain shape to the low frequency portion of the combined difference input signal to provide a low-frequency gain output;

applying a second gain shape to the high frequency portion of the combined difference input signal to provide a high-frequency gain output;

adding the low-frequency gain output with the high-frequency gain output to form an adjusted sensor derived signal; and adding the operator input signal with the adjusted sensor derived signal to determine a total control input for control of movement of the object relative to the target.

9. The method of claim 8, wherein said separating step includes filtering out the low frequency portion of the combined difference input signal, and subtracting the low frequency portion of the combined difference input signal from the combined difference input signal to obtain the high frequency portion of the combined difference input signal.

10. The method of claim 8, wherein a low frequency authority limit of zero is applied to the low frequency portion of the combined difference input signal in order to minimize autonomous interference with operator input which is represented by low frequency content.

11. The method of claim 8, wherein a high frequency authority limit of infinity is applied to the high frequency portion of the combined difference input signal in order to maximize high frequency tracking assistance for sensor-derived input which is represented by high frequency content.

12. The method of claim 8, wherein the adjusted sensor derived signal is scaled between zero and one based on a range to objective input and a region-of-assistance function shape.

13. The method of claim 12, wherein:
the range-to-objective input is a range of the object relative to the target; and
the adjusted sensor derived signal is scaled to one when the range-to-objective input is within a region of assistance and is scaled to zero when the range-to-objective input is outside the region of assistance.

14. The method of claim 8, wherein:
applying the first gain shape to the low frequency portion of the combined difference input signal is done within a low frequency authority limit range;
applying the second gain shape to the high frequency portion of the combined difference input signal is done within a high frequency authority limit range; and
the low frequency authority limit, the high frequency authority limit, the low frequency authority limit range and the high frequency authority limit range are all adjustable to allow for variable autonomy configurations ranging from fully autonomous with sensor-derived input to fully operator controlled.

15. The method of claim 8, wherein the object is a refueling boom and the target is a refueling receptacle for an in-flight refueling system.

16. The method of claim 8, wherein the object and the target are used in a simulation environment for crew training.

* * * * *